(12) United States Patent
Flury et al.

(10) Patent No.: US 8,151,974 B2
(45) Date of Patent: Apr. 10, 2012

(54) DEVICE FOR THE LINEAR MOVEMENT OF A CARRIAGE

(75) Inventors: Peter Flury, Gunzwil (CH); Christoph Peter, Lucerne (CH); Dominik Staubli, Horw (CH); Stefan Viviroli, Horw (CH)

(73) Assignee: Komax Holding AG, Dierikon (CH)

( * ) Notice: Subject to any disclaimer, the term of this patent is extended or adjusted under 35 U.S.C. 154(b) by 447 days.

(21) Appl. No.: 12/502,265

(22) Filed: Jul. 14, 2009

(65) Prior Publication Data

US 2010/0006401 A1  Jan. 14, 2010

(30) Foreign Application Priority Data

Jul. 14, 2008 (EP) ..................................... 08160346

(51) Int. Cl.
*B65G 21/20* (2006.01)
(52) U.S. Cl. ..................................... 198/468.2; 198/619
(58) Field of Classification Search .................. 198/619, 198/805, 468.2
See application file for complete search history.

(56) References Cited

U.S. PATENT DOCUMENTS

| | | | |
|---|---|---|---|
| 6,786,319 B2 * | 9/2004 | Pan ............................ | 198/339.1 |
| 6,796,417 B2 * | 9/2004 | Soldavini et al. ........ | 198/370.06 |
| 7,673,739 B2 * | 3/2010 | Freeman .................. | 198/810.02 |
| 7,924,127 B2 * | 4/2011 | Jeong et al. .................... | 335/222 |
| 2004/0026177 A1 | 2/2004 | Ayano et al. | |
| 2008/0087502 A1 | 4/2008 | Zapf | |
| 2009/0178902 A1 * | 7/2009 | Lynn et al. ............... | 198/810.02 |

FOREIGN PATENT DOCUMENTS

| | | |
|---|---|---|
| EP | 1 344 959 A2 | 9/2003 |
| EP | 1 522 377 A1 | 4/2005 |
| WO | WO 2006/076887 A1 | 7/2006 |

* cited by examiner

*Primary Examiner* — Mark A Deuble
(74) *Attorney, Agent, or Firm* — Fraser Clemens Martin & Miller LLC; William J. Clemens

(57) ABSTRACT

A linear axle for contactless energy transmission has a belt with an electrical conductor, a movable carriage and a circuit that is movable with the carriage and which is electrically connected with the conductor. In addition, a locationally fixed circuit and an inductive coupling device are provided to inductively couple electrical energy from the locationally fixed circuit into the conductor of the belt.

14 Claims, 5 Drawing Sheets

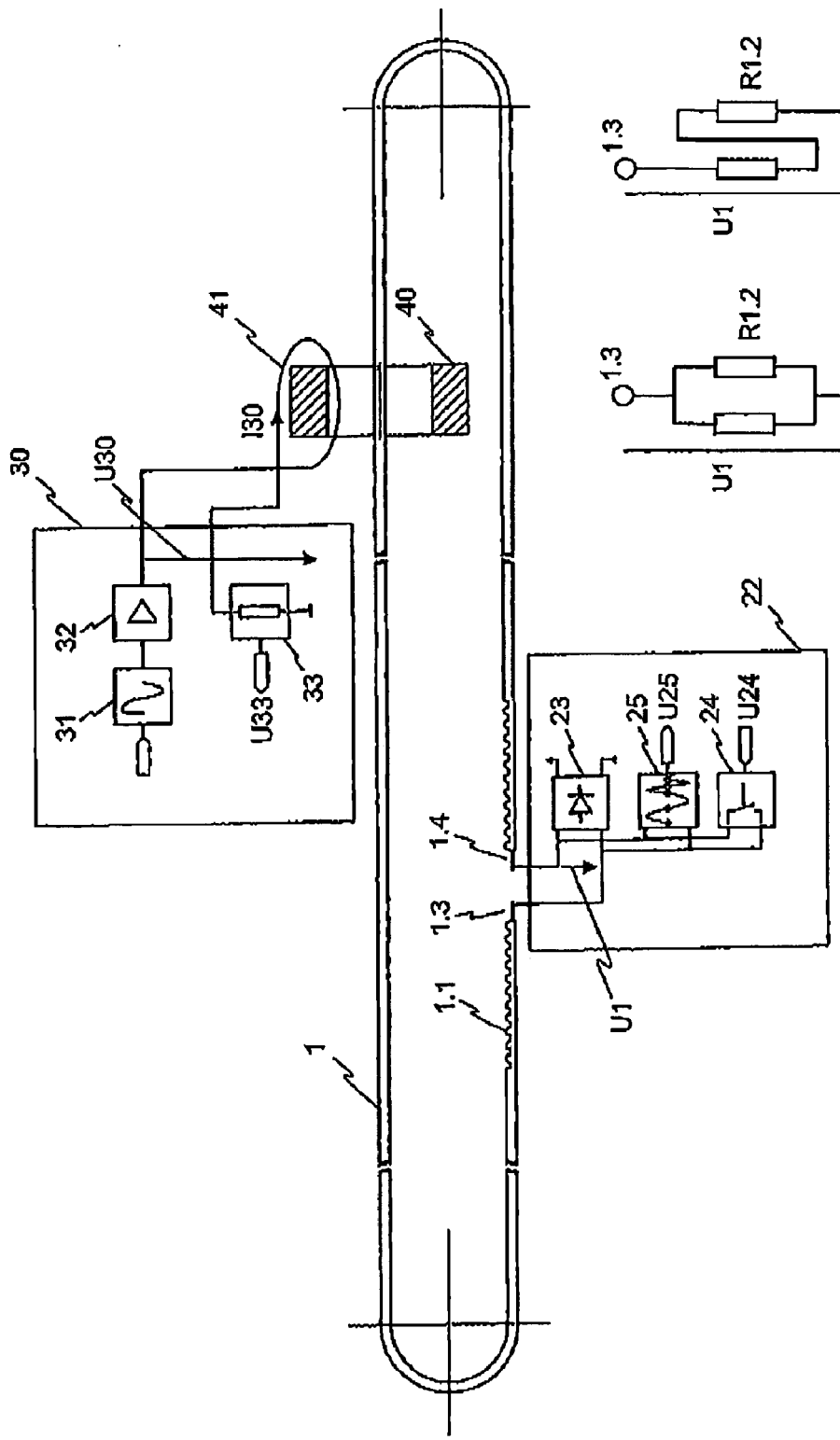

DEVICE FOR THE LINEAR MOVEMENT OF A CARRIAGE

FIELD OF THE INVENTION

The invention relates to a device for the linear movement of a carriage.

This device, hereinafter also referred to as a linear axle or linear guide with drive, allows a low-friction translation of one or more subassemblies of a machine along a linear path. For this purpose the linear axle contains a carriage on which the subassembly is arranged and which can be moved along this linear path.

BACKGROUND OF THE INVENTION

In a possible embodiment of the linear axle the carriage is moved by means of a motor-driven toothed belt. If sensors and electrically powered components are to be moved along with the carriage, this results in a high outlay for the safe guidance of the cables that are moved along with the carriage. In many cases the cables must be laid in drag chains, which burdens the linear axle with additional mass and friction. This embodiment also has the disadvantage that the drag chains and cables are subjected to high wear and hence have only a limited service life.

SUMMARY OF THE INVENTION

With this prior art as starting point, a purpose of the invention is to present a device for the linear movement of a carriage which obviates the need for a drag cable and in which the energy can nevertheless be transmitted to a circuit that is moved along with the carriage of the linear axle.

The device for the linear movement of a carriage according to the invention comprises a belt with an electric conductor and a movable carriage as well as a circuit that is movable along with the carriage and electrically connected with the conductor. In addition, a locationally fixed circuit and a means for inductively coupling are provided to inductively couple electrical energy from the locationally fixed circuit into the conductor.

In an embodiment of the device according to the invention, the belt is embodied at least partially as a toothed belt. This has the advantage that the teeth of the belt can be used to tension the belt. Moreover, in the area where the teeth of the belt are in contact with the support of the carriage, they form a positive interlock.

In a further embodiment of the device according to the invention the belt has tension cords that serve as electric conductors. In this manner the tension cords combine several functions together.

Furthermore, in the device according to the invention provision can be made for the ends of the belt and/or of the conductor to be clamped to the carriage. In this manner the electric signal or electric voltage that is present on the belt can be easily tapped.

In a further development of the device according to the invention, provided on the carriage are contact elements with which the ends of the conductor are electrically connected.

To fulfill the purpose it is further proposed that in the device the means of inductive coupling comprises a magnetically conductive toroidal core with at least one winding and that the belt passes through the toroidal core.

Furthermore, in the device according to the invention, the locationally fixed circuit can be embodied and operable in such manner that it generates in the winding a modulated alternating current.

According to a further characteristic of the invention, the invention can be further improved in that in the device the locationally fixed circuit is embodied and operable in such manner that with it the power that is consumed can be measured and evaluated.

In a further embodiment of the device according to the invention, one or more wire grippers are arranged on the carriage.

Moreover, in the belt of the device some of the electric conductors can contain copper. By this means the conductivity within the belt is optimized.

Furthermore, the device according to the invention can have a further means of inductive coupling that is arranged on the carriage. This has the advantage that the invention can also be used when the belt is an endless belt and the conductors in the belt are not directly accessible.

Finally, the device according to the invention can be used for the processing of wires. In particular, the linear axle is suitable for threading and tautening wires.

DESCRIPTION OF THE DRAWINGS

The above as well as other advantages of the present invention will become readily apparent to those skilled in the art from the following detailed description of a preferred embodiment when considered in the light of the accompanying drawings in which:

FIG. 4 shows a block diagram;

FIG. 5 shows the substitute electric circuit diagram for the case that the tension cords are connected in parallel;

FIG. 6 shows the substitute electric circuit diagram for the case that the tension cords are connected in series;

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
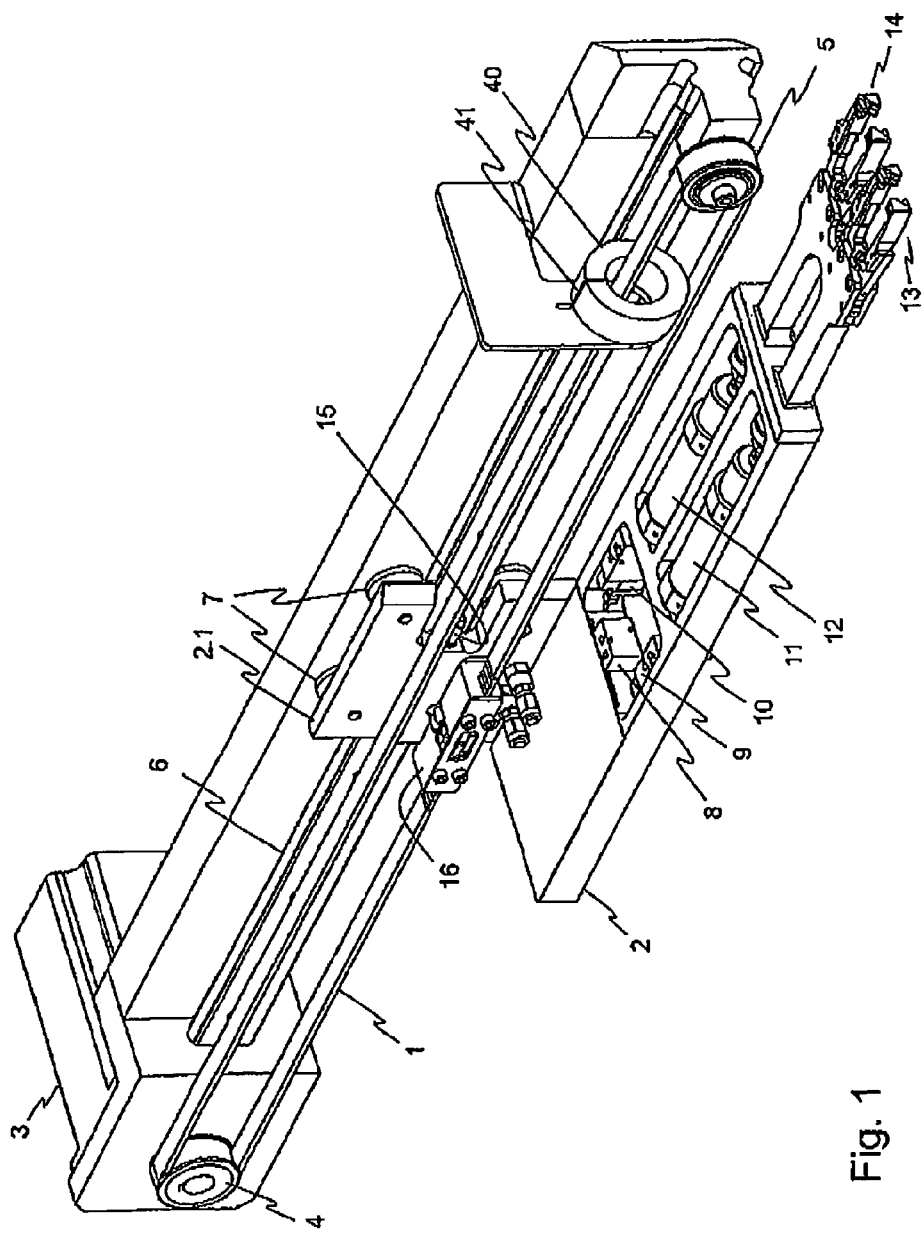
FIG. 1 shows the linear axle in perspective view.

An embodiment of the invention is described in greater detail below by reference to FIGS. 1 to 4. Shown in FIG. 1 is a possible embodiment of the linear axle according to the invention in a perspective view. The linear axle comprises a belt 1 with several tension cords 1.2 which simultaneously serve as electric conductors. The belt 1 is driven by means of an electric drive 3 and guided by two reversing pulleys 4 and 5. Hereinafter, the reversing pulleys 4 and 5 are also referred to as belt sheaves. In addition, a mechanical guide 6 is provided which guides the carriage 2 on a linear path. For this purpose, via guide pulleys 7 that are connected with the carriage support 2.1, the carriage 2 is movably borne on the guide 6. At one of its ends the carriage 2 bears a first wire gripper 13 which is driven by a first pneumatic cylinder 11. The first pneumatic cylinder 11 is controlled by a first solenoid valve 9 which is also mounted on the carriage 2. In addition, at the same end, the carriage 2 bears a second wire gripper 14 which is driven by a second pneumatic cylinder 12. The second pneumatic cylinder 12 is controlled by a second solenoid valve 10. The supply of compressed air to both pneumatic cylinders 11 and 12 takes place via a compressed-air connection 15 which is located on the carriage support 2.1. In addition, the linear guide bears a toroidal ring 40 through which the belt 1 is guided preferably contactlessly.

Figure 2:
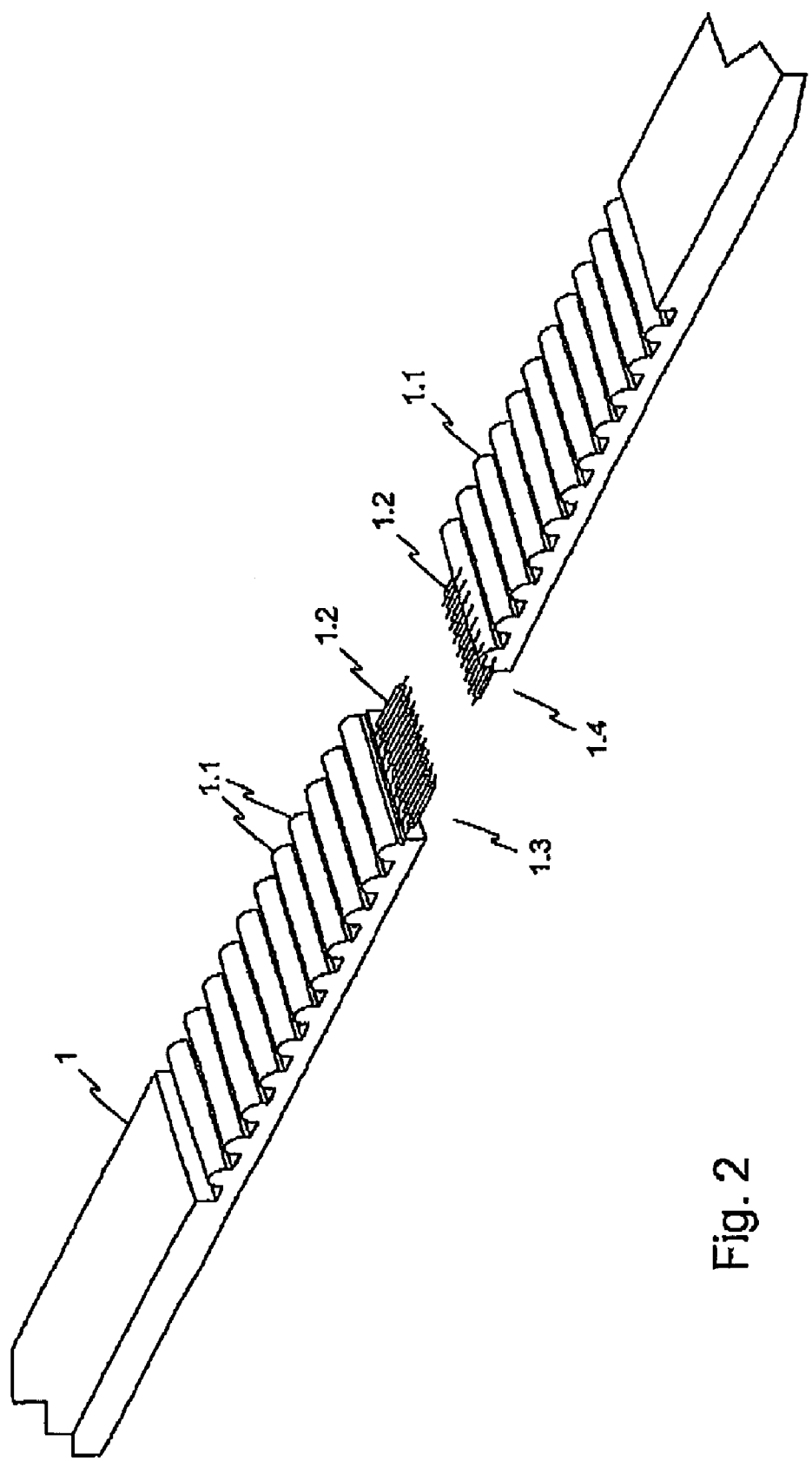
FIG. 2 shows a cutout of the toothed belt in perspective view.

Shown in FIG. 2 is a possible embodiment of the belt 1 in a three-dimensional view. In this embodiment the belt 1 is not an endless belt but has a first end 1.3 and a second end 1.4. In addition, in the end areas the belt 1 has teeth 1.1. Provided in the belt are the tension cords 1.2 which simultaneously serve as electric conductors.

However, instead of these, the belt 1 can also have one or more tension cords as well as one or more electric conductors. The tension cords can be, for example, synthetic fiber cords. In this variant, for the electric conductors use can be made of, for example, copper conductors.

The belt can also be embodied as, for example, a flat belt, a longitudinally grooved belt, or a v-belt.

Figure 3:
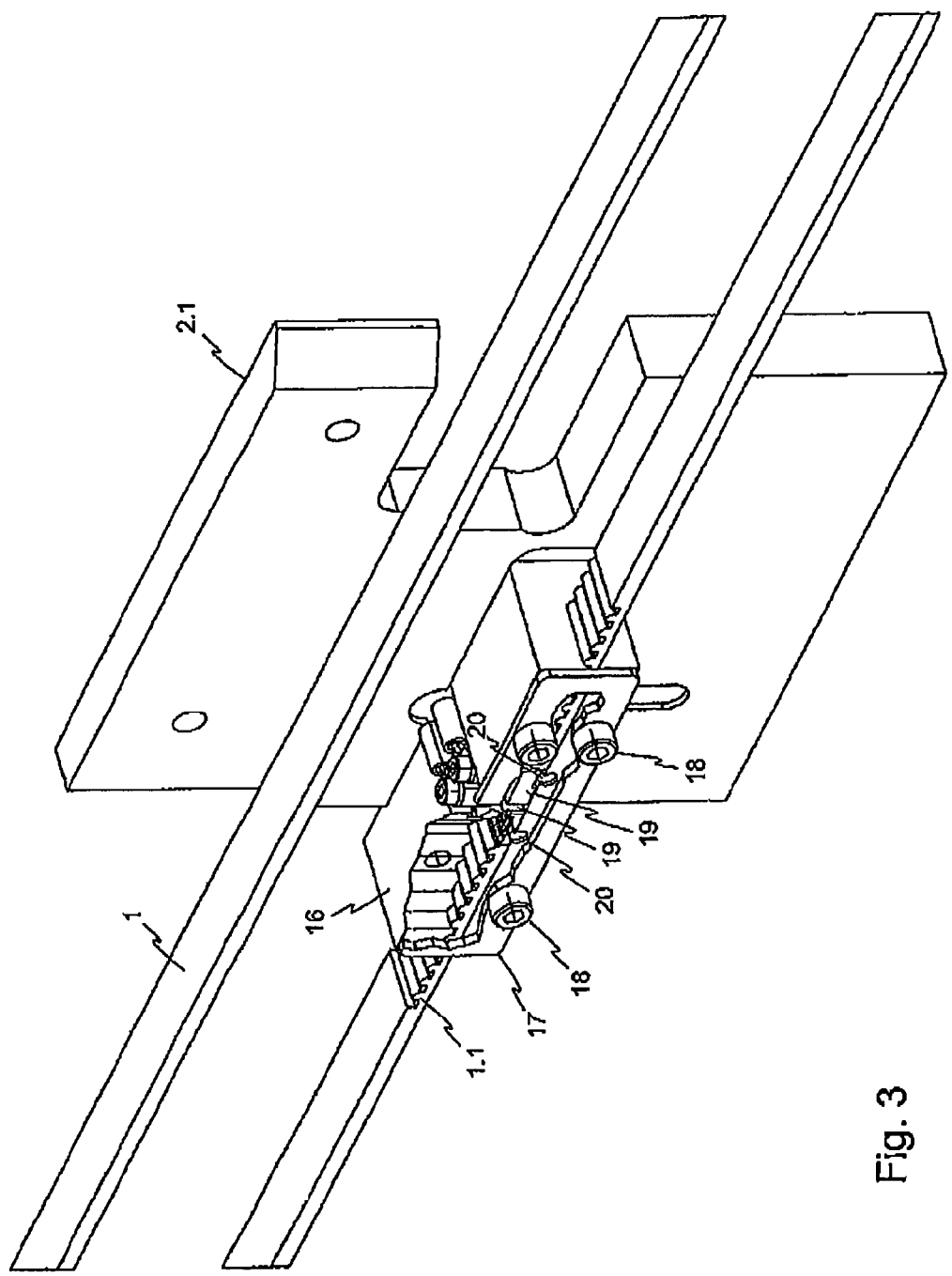
FIG. 3 shows the clamping device in perspective view with partially cut away parts.

In FIG. 3, the clamping of the belt 1 on the carriage support 2.1 is shown as a three-dimensional detail view. For better understanding, part of the clamping is shown cut away. The first end 1.3 of the belt 1 is introduced into a clamping block 16 from one side of the latter and clamped there by means of several screws 18 and a clamping plate 17. The second end 1.4 of the belt 1 is introduced into the clamping block 16 from the other side of the latter and clamped there also by means of the screws 18 and the clamping plate 17. The clamping block 16 consists preferably of plastic.

The tension cords 1.2 rest on pins 20 and are clamped with the contact elements 19 in such manner that they are electrically connected with the latter. Located on the contact elements 19 are the electric connections. In this manner, a voltage U1 that is present on the belt 1 is tappable on the contact elements 19.

As shown in FIG. 4, provided on the carriage 2 is a circuit 22 which is electrically connected with the conductors 1.2 of the belt 1. In addition, a locationally fixed circuit 30 and a means of inductive coupling 40, 41 are present to inductively couple electrical energy from the locationally fixed circuit 30 into the conductor 1.2.

In the interest of simplicity, the belt 1 shown in FIGS. 1 to 4 is shown with teeth 1.1 only at the ends 1.3 and 1.4. Normally, however, the belt has teeth 1.1 along the entire length.

The solution according to the invention has the advantage that a commercially available belt that is already present as a drive element of the linear axle can be used for transmission of the electrical energy. The tension cords 1.2 are completely embedded in the plastic material of the belt body and thus sufficiently insulated.

In particular with a relatively long linear axle, the avoidance of a drag cable is advantageous. In view of its length, the belt 1 is usually not embodied as an endless belt but is cut to the desired length and the two ends 1.3 and 1.4 of the belt 1 are clamped to the carriage to transmit the tension forces onto the carriage 2. The clamping is simplified by the positive interlocking that is attainable by the teeth 1.1 of the belt 1. It is expedient to contact the ends 1.3 and 1.4 of the tension cords 1.2 of the belt 1 directly in the carriage 2. To facilitate contacting, the plastic material of the belt 1 can be removed to a certain length or the plastic never applied.

By means of an alternating current generator 31, an alternating voltage is generated in the locationally fixed circuit 30, amplified with an amplifier end-stage 32, and guided with at least one winding 41 around the magnetic toroidal core 40. As a result, a magnetic flux occurs in the toroidal core 40. Since the belt 1 runs through the toroidal core 40, an alternating voltage U1 is induced in the tension cords 1.2 of the belt 1. This alternating voltage U1 can be tapped in the moved circuit 22 on the carriage 2 at the contact points 19. In case of need, the alternating voltage U1 can be rectified with a rectifier 23 and used to supply electrically powered components as, for example, the solenoid valves 9 and 10 and sensors.

Normally, several tension cords 1.2 are embedded parallel adjacent to each other in the plastic. From the type of the contacting of the individual cords 1.2 and the number of windings on the toroidal core, the ratio can be determined between the voltage applied to the toroidal core 40 and the induced voltage U1 on the belt 1.

If, for example, as shown simplified in FIG. 5, all tension cords 1.2 are connected in parallel and the toroidal core 40 is wound with one single winding 41, the ratio of the primary winding to the secondary winding and thus the ratio of the voltages U30:U1=1:1. This manner of connection produces the lowest internal electric resistance of the belt 1. With "N" tension cords 1.2 connected in parallel, the resulting internal resistance or total resistance Rges of the belt 1 is Rges=R1.2/N, where R1.2 is the resistance of a single tension cord.

If, on the other hand, as shown in FIG. 6, two tension cords 1.2 are connected in series and the toroidal core 40 is wound with one single winding, the ratio of the primary winding to the secondary winding and thus the ratio of the voltages U30:U1=1:2. However, in this case, relative to the case described in FIG. 5, the internal electric resistance of the belt 1 has quadrupled. With "N" tension cords 1.2 connected in series, the resulting internal resistance Rges of the belt 1 is Rges=N*R1.2. To connect the individual tension cords 1.2 in series, between the ends of the tension cords a conducting bridge can be provided which connects one end of one tension cord with the oppositely lying other end of another tension cord.

The tension cords 1.2 are normally composed of steel. To further increase the electrical conductivity, additional cords of copper can also be embedded in the plastic of the belt 1.

The power range depends on the magnetic characteristics of the toroidal core 40, the amplitude and frequency of the applied voltage U30, and the internal resistance of the belt 1. The power requirement will normally be less than 500 watts.

If the belt 1 is closed and the tension cords 1.2 not interrupted, a second magnetically conductive toroidal core can be used which is, however, not shown in the figures. This second toroidal core is mounted on the moved carriage 2 so that the belt 1 also runs through the second toroidal core. As a result of the short-circuited tension cords 1.2, the alternating current that is induced generates a current in the belt 1 which in turn causes a magnetic flux in the second movable magnetic toroidal core. Also laid around this second toroidal core is at least one wire loop on which the alternating voltage U1 can be tapped for further processing. In this case, the conversion of electrical energy into magnetic energy and back into electrical energy is performed twice.

The alternating voltage U30 that is generated by the locationally fixed circuit 30 is modulated as a carrier signal by, for example, the known method of Frequency Shift Keying (FSK), Amplitude Shift Keying (ASK), or Phase Shift Keying (PSK), or a combination thereof. In FSK, the information is contained in the frequency of the signal. A specific frequency is assigned to each condition that it is desired to transmit. In ASK, the amplitude is modulated. In PSK, the desired condition is transmitted with the phase position of the carrier signal. For this purpose, the locally fixed circuit 30 has a correspondingly embodied modulator and an alternating current generator 31. Depending on the method of modulation, the frequency, the amplitude, or the phase of the signal can be read out at the ends 1.3 and 1.4 of the tension cords 1.2 of the belt 1.

Figure 7:
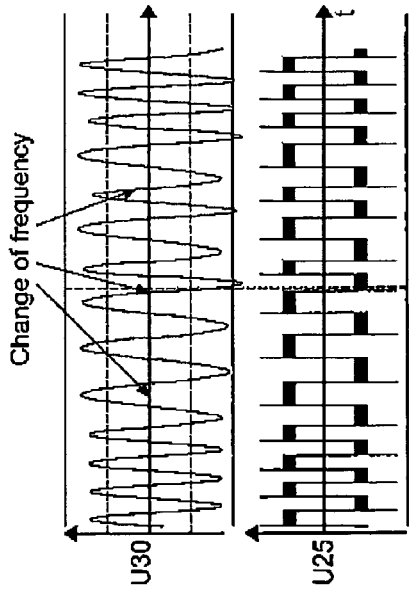
FIG. 7 shows the voltage pattern in the normal state without communication.

FIG. 7 shows the pattern over time of the voltages U30, U25 and U33 in the normal state without communication. In FIG. 7 the voltage U25 is the voltage on the output of a wave-width meter 25 that is provided on the movable circuit 22. The wave-width meter 25 delivers a rectangular signal which in advantageous manner is less susceptible to faults. U30 is the output voltage of the locationally fixed circuit 30, and the voltage U33 is the voltage on the output of an energy meter 33 that is provided on the locationally fixed circuit 30. As may be seen in FIG. 7, the voltage U25 of the wave-width meter 25 on the movable circuit 22 follows the pattern of the output voltage U30 of the locationally fixed circuit 30.

Figure 8:
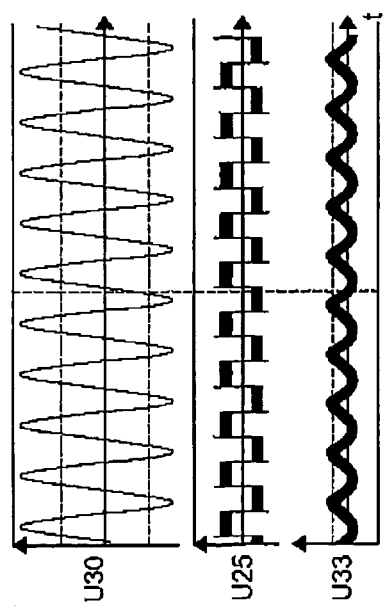
FIG. 8 shows the voltage pattern in a data transmission from the locationally fixed circuit to the circuit on the carriage.

FIG. 8 shows the pattern over time of the voltages U30 and U25 when a signal is transmitted from the locationally fixed circuit 30 to the circuit 22 on the carriage 2. Recognizable from the pattern is that the change in frequency of the output voltage U30 of the locationally fixed circuit 30 causes the same change in frequency of the voltage U25 on the movable circuit 22.

Figure 9:
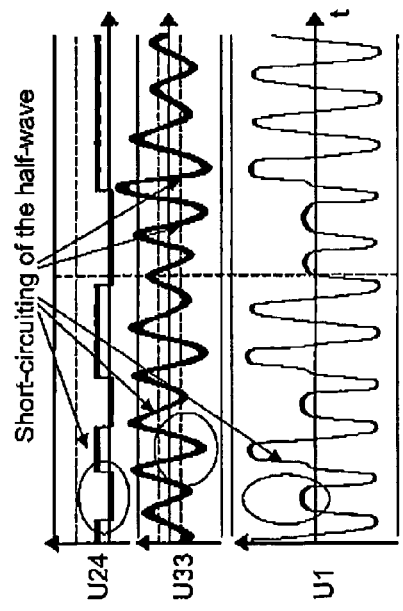
FIG. 9 shows the voltage pattern in a data transmission from the circuit on the carriage to the locationally fixed circuit.

The circuit 22 on the carriage 2 is constructed in such manner that the electric load on the ends 1.3 and 1.4 of the tension cords 1.2 can be changed for precisely determined periods of time. This can be brought about, for example, by switched-in resistors, short-circuiting, or interruption of the voltage. Shown graphically in FIG. 9 as example are the patterns over time of the voltages U33 and U30 depending on whether the short-circuit switch 24 is open or closed. The thus time-changed energy uptake of the circuit 22 on the carriage 2 acts through the toroidal core 40 as far as the locationally fixed circuit 30 where by means of an energy measuring device 33 it can be detected and further processed. As may be seen in FIG. 9, the voltage U33 on the output of the energy measurement device 33 changes depending on whether the switch 24 is open or closed. The switch 24 thus serves to transmit the signal from the movable circuit to the locationally fixed circuit.

By means of a suitable embodiment of the two circuits 22 and 30, the breakage of tension cords 1.2 or the undesired wear of the plastic material of the belt 1—which results in a short circuit with the belt sheaves 4 and 5—is detected.

During operation, the voltage U1 that is present on the ends 1.3 and 1.4 is constantly monitored. If under current loading the voltage U1 falls more than average, the internal resistance of the belt 1 has increased, which indicates a breakage of a tension cord. If the voltage U1 completely disappears without the current load increasing, this indicates a short circuit between the tension cords 1.2 and the belt sheaves 4 and 5. With the locationally fixed circuit 22 the condition of the belt 1 can thus be determined.

The linear axle with the two wire grippers 13 and 14 can be operated as follows. If the carriage 2 is in the right-hand end position, the pneumatic cylinders 11 and 12 are extended beyond the compressed air connection 16 and the wire grippers 13 and 14 thereby closed. The solenoid valves 9 and 10 are switched, which causes the wire grippers 13 and 14 to remain closed when the carriage 2 moves away. After handover of the pulled out wire, the solenoid valves 9 and 10 are switched and the wire grippers 13 and 14 are opened by means of the resetting springs in the pneumatic cylinders 11 and 12. The pressure in the pneumatic cylinders 11 and 12 can be monitored with a pressure switch 8. The positions of the pneumatic cylinder 11 and 12 can be detected with position switches on the cylinders.

With additional circuit components that are not shown in FIG. 4 the movable circuit 22 analyzes the signal U25 and then switches the solenoid valves 9 and 10 correspondingly. The rectifier 23 serves as a current source inter alia for the movable circuit 22 and the solenoid valves 9 and 10.

The described embodiments are suitable both for the transmission of signals from the movable circuit 22 to the locationally fixed circuit 30 and from the locationally fixed circuit 30 to the movable circuit 22. Signal transmission can take place optionally unidirectionally or bidirectionally. Moreover, with the described embodiments energy can also be transmitted from the locationally fixed circuit 30 to the movable circuit 22. Energy transmission is here to be understood as signal transmission and/or energy transmission in the strict sense depending on the context.

The foregoing description of the exemplary embodiments according to the present invention serves only illustrative purposes and not the purpose of restricting the invention. Within the scope of the invention various changes and modifications are possible without exceeding the scope of the invention or its equivalents.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A device for linearly moving a carriage, comprising:
   a belt having at least one electrical conductor;
   a movable carriage;
   a circuit movable with said carriage and electrically connected with said at least one electrical conductor;
   a locationally fixed circuit; and
   means for inductively coupling electric energy from said locationally fixed circuit into said at least one electrical conductor.

2. The device according to claim 1 wherein said belt is a toothed belt.

3. The device according to claim 1 wherein said belt has tension cords that serve as said at least one electrical conductor.

4. The device according to claim 1 wherein ends of said belt and/or ends of said at least one electrical conductor are clamped to said carriage.

5. The device according to claim 1, further comprising contact elements arranged on said carriage, wherein ends of said at least one electrical conductor are electrically connected to said contact elements.

6. The device according claim 1 wherein said means for inductively coupling comprises a winding and a magnetically conducting toroidal coil through which said belt passes.

7. The device according to claim 6 wherein said locationally fixed circuit has an alternating current generator for generating a modulated alternating current in said winding.

8. The device according to claim 1 wherein said locationally fixed circuit measures and evaluates power coupled into said at least one electrical conductor.

9. The device according to claim 1, further comprising at least one wire gripper arranged on said carriage.

10. The device according to claim 1 wherein said at least one electrical conductor contains copper.

11. A method of transmitting energy, comprising:
- generating a modulated signal with a locationally fixed circuit;
- coupling the modulated signal with means for inductively coupling into a belt having at least one electrical conductor; and
- operating a circuit movable with a movable carriage to detect the modulated signal from said belt.

12. The method according to claim 11, further comprising operating said circuit to change an electric load including said at least one electrical conductor thereby changing the detected modulated signal and evaluating the changed detected modulated signal with said locationally fixed circuit.

13. The method according to claim 11, further comprising operating said locationally fixed circuit to determine a condition of said belt.

14. A device for the linear movement of a carriage, comprising:
- a belt having a plurality of longitudinally extending electrical conductors;
- a movable carriage;
- a circuit movable with said carriage and electrically connected with said electrical conductors;
- a locationally fixed circuit; and
- means of inductive coupling to inductively couple electric energy from said locationally fixed circuit into said electrical conductors.

* * * * *